United States Patent [19]

Sohda et al.

[11] Patent Number: 5,057,254
[45] Date of Patent: Oct. 15, 1991

[54] PROCESS FOR PRODUCING CARBON/CARBON COMPOSITES

[75] Inventors: Yoshio Sohda; Yasuji Ido, both of Kanagawa; Toshinori Nakamura; Takeshi Suemitsu, both of Hyogo, all of Japan

[73] Assignees: Nippon Oil Company, Limited, Tokyo; Kawasaki Heavy Industries, Ltd., Hyogo, both of Japan

[21] Appl. No.: 330,633

[22] Filed: Mar. 30, 1989

[30] Foreign Application Priority Data

Apr. 1, 1988 [JP] Japan ................................. 63-77997

[51] Int. Cl.[5] ...................... B29C 43/10; C08L 95/00
[52] U.S. Cl. ................................. 264/29.2; 264/29.5; 264/29.7; 264/500; 264/510
[58] Field of Search ...................... 264/570, 29.2, 29.5, 264/29.7, 500, 510

[56] References Cited

U.S. PATENT DOCUMENTS 3,931,382  1/1976  Witkin ........................ 264/DIG. 50
4,554,024  11/1985  Zimmer et al. ..................... 427/227
4,744,943  5/1988  Timm .

OTHER PUBLICATIONS

Grenie, Yves; "Carbon-Carbon Composites and Aerospatiale, State of the Art and Prospects"; Looking Ahead for Materials and Processes; Elsevier Science Publishers B.V., Amsterdam, Netherlands (1987) pp. 377-386.

*Primary Examiner*—Hubert C. Lorin
*Attorney, Agent, or Firm*—Scully, Scott, Murphy & Presser

[57] ABSTRACT

A carbon/carbon composite is produced by impregnating a primary-formed product consisting essentially of carbon fibers and a carbonized or graphitized matrix with a carboneceous pitch, heat-treating the thus-impregnated primary-formed product under hot isostatic pressing and carbonizing or graphitizing the thus heat-treated primary-formed product.

5 Claims, No Drawings

PROCESS FOR PRODUCING CARBON/CARBON COMPOSITES

BACKGROUND OF THE INVENTION

The present invention relates to a process for producing a carbon/carbon composite.

Carbon/carbon composite have unique properties such as maintaining high strength and high modulus even at high temperatures above 1,000° C. and having small coefficient of thermal expansion, and their application to components of airospace-craft and devices, brakes and furnace materials are expected.

Carbon/carbon composites are produced by heat treating carbon fibers together with a carbonizable material (matrix) such as phenol or pitch. A carbonaceous pitch, due to a high carbonization yield thereof, is very preferable as a matrix material of a carbon/carbon composite, but it expands in volume during carbonization and forms voids in the matrix, so in the actual production there is repeated a cycle of impregnation and carbonization. On the other hand, in order to attain a high carbonization yield, there has been adopted a method wherein carbonization is performed under hot isostatic pressing (HIP). But, even such HIP is used, it is said that five to eight impregnation-carbonization cycles are usually needed. This repetition of the impregnation-pressure carbonization cycle results in a complicated manufacturing process, thus requiring longer days and increased cost.

SUMMARY OF THE INVENTION

It is an object of the present invention to overcome the above-mentioned drawbacks of the prior art.

It is another object of the present invention to provide a simple process for producing a carbon/carbon composite superior in strength and moldability, permitting molding into complicated shapes of parts.

The present invention resides in a process for producing a carbon/carbon composite, which process comprises impregnating a primary-formed product consisting essentially of carbon fibers and a carbonized or graphitized matrix with a carbonaceous pitch, then heat-treating the thus-impregnated primary-formed product under hot isostatic pressing, and if necessary, further carbonizing or graphitizing the heat-treated primary-formed product.

DETAILED DESCRIPTION OF THE INVENTION

The process for producing a carbon/carbon composite material according to the present invention will be describe in detail hereinunder.

The "carbon fibers" as referred to herein indicate pitch-,polyacrylonitrile- or rayon-based, preferably pitchbased, carbon fibers usually in the range of 5 to 100 μm in diameter. The "pitch-based carbon fibers" are obtained by melt-spinning a carbonaceous pitch and subjecting the resulting pitch fibers to infusiblization, cabonization, and if necessary, graphitization.

The carbon fibers are usually employed as a two of 500 to 100,000 filaments, which are usually formed into shape in two or three dimensions such as, for example, a unidirectional laminate, a two-dimensional fabric or a laminate thereof, a three or more dimensional fabric, or a product formed in the shape of mat or felt.

The carbon fibers are impregnated or mixed with a carbonizable material as matrix precursor such as a carbonaceous pitch, a phenolic resin or a furan resin followed by heat treatment under pressure to obtain a primary-formed product. During this operation and/or subsequently the said carbonizable material matrix is heat-treated such as cured, post-cured, pre-carbonized, carbonized or graphitized.

The above heat treatment under pressure is usually conducted using a uniaxial press for the application of pressure such as hot press or an autoclave, the former being particularly preferred.

Explanation will now be made about the case where a primary-formed product is to be obtained using a matrix starting from a carbonaceous pitch as the carbonizable material matrix. The "matrix starting from a carbonaceous pitch" indicates a carbonaceous pitch or a carbonizable material derived from a carbonaceous pitch such as material or fibers obtained by rendering the carbonaceous pitch infusible.

The "carbonaceous pitch" as referred to herein indicates a coal or petroleum pitch having a softening point of 100° C. to 400° C., preferably 150° to 350° C. Both optically isotropic and anisotropic pitches are employable, but an optically anisotropic pitch having an optically anisotropic phase content of 60 to 100 vol.% is particularly preferred.

The "infusiblized fibers" as referred to herein indicates fibers obtained by making pitch fibers infusible which pitch fibers are obtained by melt-spinning the carbonaceous pitch by a known method and have an average diameter in the range of 5 to 100 μm, preferably 7 to 30 μm. This infusiblization treatment can be conducted in an oxidative gas atmosphere at 5–400° C., preferably 100–350° C. As the oxidative gas there may be used air, oxygen, nitrogen oxides, sulfur oxides, halogens, or a mixture thereof. The treatment time is usually in the range of 10 minutes to 20 hours.

The following are mentioned as concrete examples of methods for producing a molded product using such carbonaceous pitch or matrix derived therefrom:

(1) a method wherein a tow of the carbon fibers is impregnated with the carbonaceous pitch and the thus-impregnated two is carbonized under uniaxial pressing to obtained a primary-formed product, (2) a method wherein a tow of the carbon fibers is impregnated with the carbonaceous pitch and the thus-impregnated tow is rendered infusible, then carbonized under uniaxial pressing to obtain a primary-formed product, and (3) a method wherein a tow of the carbon fibers is laminated with the infusiblized fibers alone or both the infusiblized fibers and the carbonaceous pitch as matrix precursor, followed by carbonization under uniaxial pressing to obtain a primary-formed product.

According to the method (1), a tow of the carbon fibers, e.g., a two dimensional fabric or a laminate thereof, a three or more dimensional fabric, felt, or mat, is impregnated with the carbonaceous pitch. The impregnation is attained by heat-melting the carbonaceous pitch. In this case, the viscosity in the impregnation may be reduced by cut-back using a solvent. Examples of the solvent include aromatic hydrocarbons, pyridine and quinoline. The thus-impregnated tow is heat-treated (carbonized) under uniaxial pressing to obtain a primary-formed product.

According to the method (2), the above impregnated tow is rendered infusible. This infusiblization treatment may be conducted in an oxidative gas atmosphere at a 50°–400° C., preferably 100°–350° C. As the oxidative gas there may be used one of air, oxygen, nitrogen oxides, sulfur oxides, halogens, or a mixture thereof. The infusiblization may be done up to the center of the impregnated tow, or it may be done to the extent that the shape of the impregnated tow can be retained in the subsequent carbonization treatment. The impregnated tow of carbon fibers thus rendered infusible is then heat-treated (carbonized) under uniaxial pressing to obtain a primary-formed product.

According to the method (3), a tow of the carbon fibers is laminated with the infusiblized fibers or both the infusilized fibers and the carbonaceous pitch, followed by heat treatment (carbonization) under uniaxial pressing. For example, the infusiblized fibers or a mixture thereof with the carbonaceous pitch is sandwiched by a two-dimensional fabric of the carbon fibers to obtain a laminate, then a required number of such laminates are put one upon another, followed by hot pressing. The infusiblized fibers or the carbonaceous pitch may be pulverized in advance if necessary.

The blending ratio of the infusiblized fibers to the carbonaceous pitch is 100 parts by weight: 10–500, preferably 30–300, parts by weight. And the blending ratio of the carbon fibers to the matrix starting materials (the infusiblized fibers or both the infusiblized fibers and the carbonaceous pitch) is 100 parts by weight: 10–500, preferably 30–300, parts by weight.

The heat treatment under uniaxial pressing can be carried out at a temperature in the range of 400° to 2,000-° C., preferably 500° to 1,000° C., under a pressure in the range of 5 to 500 kg/cm$^2$, preferably 10 to 100 kg/cm$^2$, using a hot press.

Where a thermosetting resin is used as the carbonizable material matrix, usually a tow of the carbon fibers exemplified above is impregnated with the thermosetting resin, then after drying if necessary at room temperature to several hundred degrees centigrade, the thus-impregnated tow is heat-treated (cured or postcured, if necessary) under pressure to obtain a primary-formed product. In the impregnation, the viscosity may be reduced by cut-back using a solvent or by heating. As the solvent, there may be used organic solvents, such as methyl ethyl ketone, methanol, or xylene.

The heat treatment is performed initially at the curing temperature of the thermosetting resin used. Usually, heating is made to a hundred and several ten degrees centigrade under a pressure of several to several hundred kilograms per square centimeter, using a uniaxial press for the application of pressure or an autoclave. If necessary, postcuring is performed at a temperature in the range from 50° C. to several hundred degrees centigrade.

The primary-formed product thus obtained is usually in the form of sheet. A volume content of the carbon fibers (Vf) and a void percentage (Vv) in the primary-formed product are determined according to purposes, but are in the ranges of 10–80 vol.% and 5–50 vol.% preferably 30–75 vol.% and 8–40 vol.%, respectively.

Where the matrix has not been carbonized or graphitized, the primary-formed product is further heat-treated for carbonization or graphitization. In this heat treatment, carbonization is performed at 600°–2,000° C., preferably 800°–2,000° C., and graphitization at 2,000°–3,000° C. Subsequently, the primary-formed product thus heat-treated is impregnated with a carbonaceous pitch, and the thus-impregnated primary-formed product is then subjected to an HIP treatment using an HIP system. The carbonaceous pitch used in this impregnation is the same as that described previously.

The impregnation of the carbonaceous pitch is attained by heat-melting the pitch and contacting the thus-molten pitch with the primary-formed product. The viscosity in the impregnation may be reduced by cut-back using a solvent. Employable solvents include aromatic hydrocarbons, pyridine and quinoline. The impregnation - HIP treatment cycle may be repeated a desired number of times for the purpose of densifying.

In the HIP treatment, the impregnated primary-formed product is contained in an open container. The "open container" indicates a container not having a sealing function. The material of the container can be selected suitably from, for example, metals such as soft steel and stainless steel, glass, graphite and ceramics, according to treating temperatures or purposes of use. For example, where the product to be heat-treated is large in quantity, it is desirable to use an HIP system with an exhaust mechanism capable of continuously controlling and exhausting gases evolved from the product being treated during HIP. More particularly, the exhaust mechanism is capable of adjusting the amount of gases to be removed according to the amount and/or diffusion rate thereof evolved. The gas exhaust mechanism comprises a heat exchanger for heat exchange with the pressure medium gas in the furnace as well as a cooler, a pressure reducing device and a flow control valve which are disposed outside the furnace.

The heat treatment under pressure in the HIP system may be performed at 100°–3,000° C., preferably 400°–2,000° C., under a pressure of an inert gas in the range of 50 to 10,000 kg/cm$^2$, preferably 200 to 2,000 kg/cm$^2$. As the pressure medium gas there may be used an inert gas such as, for example, argon, nitrogen or helium.

The carbonization or graphitization under atmospheric pressure which follows the pressure carbonization may be carried out at 400°–3,000° C. in an inert gas atmosphere. Further, in case of using an HIP system with an exhaust mechanism, the operation can be performed while analyzing evolved gases during the heat treatment, and this is an outstanding feature. According to a study made by the present inventors, it is desirable conduct the heat treatment until gases of $C_2$ or more are substantially no longer evolved, that is, until the concentration thereof in the exhaust gases is below 10 ppm, preferably below 5 ppm.

If necessary, the product thus heat-treated under pressure in the HIP system is further subjected to one or both of carbonization treatment and graphitization treatment. The carbonization treatment is performed at 600°–2,000° C., preferably 800°–2,000° C., in an inert gas and the graphitization treatment at 2,000°–3,000° C. in an inert gas.

The volume content of the carbon fibers in the resulting composite is determined suitably according to purposes, but usually it is in the range of 10 to 80 vol.% preferably 30 to 75 vol.%.

According to the process of the present invention, it becomes possible to reduce the number of impregnation-carbonization cycles and so reduce the number of days and cost required for the production of the carbon/carbon composite. Further, the strength, flatness and dimensional accuracy of the carbon/carbon composite can be improved, and it is possible to produce a carbon/carbon composite having a high volume content of the carbon fibers in a relatively simple manner.

The following examples are given to illustrate the present invention more concretely, but the invention is not limited thereto.

EXAMPLE 1

A laminate of two-dimensional fabrics (plain weave) using a tow of 2,000 pitch-based carbon filaments each 10 μm in diameter was impregnated with a petroleum pitch having a softening point of 280° C and an optically anisotropic phase content of 100%. The thus-impregnated laminate was heat-treated at 700° C. for 1 hour in a nitrogen atmosphere using a hot press to obtain a primary-formed product. The fiber volume content and void percentage were 50 vol.% and 20 vol.%, respectively. The primary-formed product was impregnated with the above petroleum pitch, and then pressurized to 400 kg/cm$^2$ with argon gas in an HIP system. Thereafter, the temperature was raised to 400° C. at a rate of 1° C./min, to 550° C. at a rate of 0.5° C./min, to 800° C. at a rate of 5° C./min, then to 1,000° C. at a rate of 2° C./min. The primary-formed product was thus carbonized under pressure. The pressure at 1,000° C. was 1,000 kg/cm$^2$. The resultant carbon/carbon composite was found to have a bulk density of 1.66 g/cm$^3$ and a fiber volume content of 50 vol.%.

Comparative Example 1

A laminate of the same two-dimensional fabrics as in Example 1 was impregnated with the same pitch as that used in Example 1. The thus-impregnated laminate was carbonized under pressure in an HIP system using the same conditions as in Example 1, then impregnated with pitch and again carbonized under pressure in the HIP system. The resultant carbon/carbon composite was found to have a bulk density of 1.35 g/cm$^3$, a fiber volume content of 30 vol.% and a void percentage of 25 vol.%. Densification was unsatisfactory as compared with that in Example 1.

Example 2

A laminate of two-dimensional fabrics (eight-satin weave) using a two of 2,000 pitch-based carbon filaments each 20μm in diameter was impregnated with the pitch used in Example 1. The thus-impregnated laminate was rendered infusible in air at 300° C. for 50 hours and then heat treated at 700° C. for 1 hour in a nitrogen atmosphere using a hot press to obtain a primary-formed product. The fiber volume content and the void percentage were 60 vol.% and 15 vol.%, respectively. The primary-formed product was impregnated with the above pitch and then pressurized to 1,000 kg/cm$^2$ using argon gas in an HIP system with an exhaust mechanism, thereafter the temperature was raised to 550° C. at a rate of 0.5° C./min and then to 1,000° C. at a rate of 5° C./min. The primary-formed product was thus carbonized under pressure. The resultant carbon/carbon composite was found to have a bulk density of 1.96 g/cm$^3$ and a fiber volume content of 60 vol.%.

EXAMPLE 3

A three-dimensional fabric (orthogonal weave) using a tow of 2,000 pitch-based carbon filaments each 10 μm in diameter was impregnated with the pitch used in Example 1. The thus-impregnated fabric was rendered infusible in air at 150° C. for 100 hours and then heat treated at 700° C. for 1 hour in a nitrogen atmosphere using a hot press to obtain a primary-formed product. The fiber volume content and the void percentage were 35 vol.% and 25 vol.%, respectively. The primary-formed product was impregnated with the above pitch and then pressurized to 1,000 kg/cm$^2$ using argon gas in an HIP system with an exhaust mechanism, thereafter the temperature was raised to 400° C. at a rate of 0.5° C./min and then to 1,000° C. at a rate of 2° C./min under exhaust at a rate of 1,000 Nm$^3$/hr to effect a carbonization treatment under pressure. The resultant carbon/carbon composite was found to have a bulk density of 1.54 g/cm3 and a fiber volume content of 40 vol.%.

EXAMPLE 4

Six sheets of the two-dimensional fabric of pitch-based carbon filaments used in Example 2 were laminated together and a mixture consisting of 50 parts by weight of infusiblized fibers and 50 parts by weight of the pitch used in Example 1 was filled between adjacent layers of the laminate. The mixing ratio of the fabrics to the said mixture was 100:70. The thus mixture-filled laminate was heat treated at 700° C. for 1 hour in a nitrogen atmosphere using a hot press to obtain a primary-formed product having a thickness of 1.6 mm. The fiber volume content and the void percentage were 65 vol.% and 16 vol.%, respectively. The primary-formed product was impregnated with the above pitch and then pressurized to 1,000 kg/cm$^2$ using argon gas in an HIP system with an exhaust mechanism, thereafter the temperature was raised to 400° C. at a rate of 0.5° C./min and then to 1,000° C. at a rate of 2° C./min under exhaust at a rate of 1,000 Nm$^3$/hr to effect a carbonization treatment under pressure. The resultant carbon/carbon composite was found to have a bulk density of 1.96 g/cm$^3$ and a fiber volume content of 60 vol.%.

EXAMPLE 5

A laminate of the two-dimensional fabrics of pitch-based carbon filaments used in Example 2 was impregnated with the pitch used in Example 1. The thus-impregnated laminate was rendered infusible in air at 300° C. for 50 hours and then heat treated at 700° C. for 1 hour in a nitrogen atmosphere using a hot press to obtain a primary-formed product. The fiber volume content and the void percentage were 60 vol.% and 15 vol.% respectively. The primary-formed product was impregnated with the above pitch and then pressurized to 1,000 kg/cm$^2$ using argon gas in an HIP system with an exhaust mechanism, thereafter the temperature was raised to 550° C. at a rate of 0.5° C./min and then to 1,000° C. at a rate of 5° C./min to effect a carbonization treatment under pressure. The thus-carbonized product was again impregnated with the above pitch and then subjected to a carbonization treatment under pressure in the HIP system using the above conditions. The resultant carbon/carbon composite was found to have a bulk density of 2.02 g/cm$^3$ and a fiber volume content of 60 vol.%.

EXAMPLE 6

A three-dimensional fabric (orthogonal weave) using a tow of 3,000 PAN carbon filaments each 7 μm in diameter was impregnated with a phenolic resin solution containing 1 wt.% of methyl ethyl ketone, then dried at room temperature for 1 hour, at 80° C. for 2 hours, followed by curing at 150° C. for 1 hour and post-curing at 200° C. for 2 hours, to obtain a CFRP primary-formed product. The CFRP was subjected to a carbonization treatment at 1,500° C. for 1 hour in a nitrogen atmosphere. The fiber volume content was 40 vol.%.

The primary-formed product was then impregnated with a petroleum pitch having a softening point of 280° C. and an optically anisotropic phase content of 100%, then placed in an open container and pressurized to 400 kg/cm$^2$ with argon gas in an HIP system, thereafter the temperature was raised to 400° C. at a rate of 1° C./min, to 550° C. at a rate of 0.5° C./min, to 800° C. at a rate of 5° C./min and then to 1,000° C. at a rate of 2° C./min to effect a carbonization treatment under pressure. The pressure at 1,000° C. was 1,000 kg/cm$^2$. The primary-formed product thus treated in the HIP system was further subjected to a carbonization treatment at 1,500° C. for 1 hour in a nitrogen atmosphere. The cycle of the above impregnation, HIP and 1,500° C.-carbonization treatment was repeated three times.

The resultant carbon/carbon composite was found to have a bulk density of 1.75 g/cm$^3$ and a void percentage of 7 vol.%.

EXAMPLE 7

A two-dimensional fabric (plain weave) using a tow of 3,000 pitch-based carbon filaments each 10 μm in diameter was impregnated with the same phenolic resin solution as that used in Example 6 and dried at room temperature for 1 hour, then at 80° C. for 2 hours. Six sheets of the thus-impregnated fabric were laminated together, cured for 1 hour under uniaxial pressing and then post-cured at 200° C. for 2 hours to obtain a CFRP primary-formed product.

The CFRP was subjected to a carbonization treatment at 2,000° C. for 1 hour in a nitrogen atmosphere. As a result, the fiber volume content was found to be 60 vol.%.

The same cycle of impregnation, HIP and 1,500° C. carbonization treatment as in Example 6 was applied to the primary-formed product. The resultant carbon/carbon composite was found to have a bulk density of 1.83 g/cm$^3$, a void percentage of 10 vol.% and a bending strength of 35 kg/mm$^2$.

COMPARATIVE EXAMPLE 2

The same CFRP primary-formed product as in Example 7 was subjected to the same 1,500° C. carbonization treatment and impregnation as in Example 7, then subjected to a carbonization treatment at atmospheric pressure in a nitrogen atmosphere under the same heat-up conditions as in the HIP treatment of Example 1 (without using an HIP system), followed by a further carbonization treatment at 1,500° C. for 1 hour. This cycle of impregnation, 1,000° C. carbonization treatment and 1,500° C. carbonization treatment was repeated three times.

The resultant carbon/carbon composite was found to have a bulk density of 1.53 g/cm$^3$, a void percentage of 25 vol.% and a bending strength of as low as 10 kg/mm$^2$. Desification was scarcely attained.

What is claimed is:

1. A process for producing a carbon/carbon composite, which comprises impregnating a primary-formed product with a carbonaceous pitch, said primary-formed product obtained by performing a first heat-treating of a matrix starting from a carbonaceous pitch and carbon fibers under uniaxial pressing, for carbonization or graphitization, said primary-formed product consisting essentially of said carbon fibers and said carbonized or graphitized matrix, performing a second heat-treating of the thus-impregnated primary-formed product under hot isostatic pressing, said second heat treatment under hot isostatic pressing being performed with an open container under a pressure of an inert gas and using a hot isostatic pressing system with an exhaust mechanism capable of continuously controlling and exhausting gases evolved during the hot isostatic pressing, and carbonizing or graphitizing the resultingly primary-formed product of the second heat treatment.

2. A process as set forth in claim 1, wherein the carbon fibers are in the form of a tow of carbon filaments.

3. A process as set forth in claim 1, wherein said primary-formed product is obtained by impregnating a tow of carbon filaments with a carbonaceous pitch, making the thus-impregnated tow infusible, and thereafter heat-treating the thus-infusiblized tow under uniaxial pressing for carbonization or graphitization.

4. A process as set forth in claim 1, wherein said primary-formed product is obtained by combining a tow of carbon filaments with infusiblized fibers or both infusiblized fibers and a carbonaceous pitch, and heat-treating the thus-combined material under uniaxial pressing for carbonization or graphitization.

5. A process as set forth in claim 1, wherein said primary-formed product is obtained by impregnating the carbon fibers with a thermosetting resin and heat-treating the thus-impregnated carbon fibers under pressure for carbonization or graphitization.

* * * * *